3,152,188
N-SUBSTITUTED POLYALKYLENE POLYAMINES HAVING 2-HYDROXYETHYL AND MONO-SEC-ONDARY - HYDROXYL HYDROCARBON SUBSTITUENTS
Willard H. Kirkpatrick, Sugar Land, and Virgil L. Seale, Houston, Tex., assignors to Nalco Chemical Company, a corporation of Delaware
No Drawing. Filed Nov. 15, 1960, Ser. No. 69,300
11 Claims. (Cl. 260—584)

This invention relates to new and useful chemical compositions and more particularly to substituted polyalkylene polyamines containing N-substituted hydroxy hydrocarbon groups derived by addition to said polyamines of hydrocarbon epoxides of two distinct types: (a) epoxides having hydrolysis products which are overwhelmingly hydrophilic in nature, and (b) epoxides having hydrolysis products which are predominantly hydrophobic in nature.

This application is a continuation-in-part of our copending application Serial No. 614,048, filed October 5, 1956, now abandoned.

One of the objects of the invention is to provide new and useful N-substituted polyalkylene polyamines having N-substituted monohydroxy hydrocarbon radicals of monohydric hydrocarbon compounds of two types—predominantly hydrophilic and predominantly hydrophobic.

Another object is to provide N-substituted polyalkylene polyamines having N-substituted alkanol radicals of two and three carbons and N-substituted monohydroxy hydrocarbon radicals of monohydroxy hydrocarbon compounds which are predominantly hydrophobic in nature.

In accordance with the invention, new chemical compounds are provided which are, broadly speaking, polyalkylene polyamines which are N-substituted with (a) at least one monohydroxy alkyl radical of an alkanol having 2 carbons, viz., ethanol, which is predominantly hydrophilic, and (b) at least one monohydroxy hydrocarbon radical having more than three carbons and up to 12 carbons of monohydric hydrocarbon compositions such as the hydrolysis products of 2-methyl propylene oxide-1,2; butylene oxide-1,2; butylene oxide-2,3; styrene oxide; epoxy diisobutylene in its various isomeric forms; epoxy triisobutylene in its various isomeric forms; and other hydrocarbon epoxides having at least four carbons such as the epoxidized isomers of hexene, monoepoxides of butadiene, isoprene, etc., including those which are available as mixtures and mixed isomers.

Our compounds may be derived by reacting polyalkylene polyamines with the two different types of hydrocarbon epoxides having the oxygen in an oxirane ring. Ethylene oxide gives N-substituted hydroxy alkyl radicals with a primary hydroxyl group (—CH$_2$OH) in the hydroxy ethyl radical (—CH$_2$CH$_2$OH) whereas propylene oxide-1,2 provides N-substituted hydroxy alkyl radicals with a secondary hydroxyl group

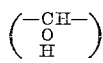

in the hydroxy propyl radical

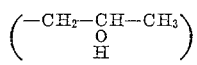

The hydrocarbon epoxides of group (b), above, give N-substituted hydroxy hydrocarbon radicals of at least four carbons with a non-primary, in general a secondary, hydroxyl group. While in theory, some oxides might give radicals with tertiary hydroxyl groups, we have no evidence to confirm either the presence or absence of such groups.

The amino reactants used in preparing the new compounds of this invention include polyalkylene polyamines having at least three amino groups with a primary amino group at each end of the molecule and one or more intermediate secondary amino groups—the amino groups being connected by alkylene groups of two to six carbons, preferably two or three carbons. The primary amino groups are considered to be more reactive; hence one could expect that the first substitution in the molecule would be at a primary amino group.

The polyalkylene polyamines contemplated within the scope of the present invention include diethylenetriamine, triethylenetetramine, tetraethylenepentamine, in pure form or as mixtures, and higher polyalkylene polyamine homologs which are usually marketed as mixed residues containing up to approximately ten alkylene groups. Other polyalkylene polyamines include 1,2- or 1,3-dipropylenetriamine, 1,2- or 1,3-tripropylenetetramine and higher homologs thereof up to about ten alkylene groups, in pure form or as mixtures. Other homologous polyalkylene polyamines with up to six carbons per alkylene group, e.g., dihexamethylene triamine and trihexamethylene tetramine are further examples of polyalkylene polyamines, as are their higher homologs.

The compositions contemplated by the present invention range from polyalkylene polyamines which are substituted by only one radical of each of the two types of hydroxy hydrocarbon groups, discussed supra, to polyalkylene polyamines which are completely N-substituted by both of the foregoing types of hydroxy hydrocarbon groups.

In general, the compositions fall within the formula:

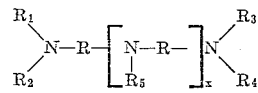

wherein R is a lower alkylene radical of 2–6 carbons; R$_1$, R$_2$, R$_3$, R$_4$, and R$_5$ are selected from the group consisting of hydrogen and monohydroxy hydrocarbon radicals, at least one of R$_1$, R$_2$, R$_3$, R$_4$, and R$_5$ being 2-hydroxy ethyl and at least one another of R$_1$, R$_2$, R$_3$, R$_4$, and R$_5$ being a monohydroxy hydrocarbon radical of at least four carbons; and $x$ is an integer of 1–9. The surface-active properties of the compounds may be enhanced by adding the hydrophilic type of monohydroxy hydrocarbon radical, 2-hydroxy ethyl, on one terminal amino nitrogen and the other type of monohydroxy hydrocarbon radical on the other terminal amino nitrogen.

Ethylene oxide and styrene oxide are well known hydrocarbon epoxides. Butylene oxide is usually available as a mixture of butylene oxide-1,2 and butylene oxide-2,3. Epoxidized diisobutylene and epoxidized triisobutylene in their isomeric forms, the epoxidized isomers of hexene, and the monoepoxides of butadiene are not as well known. The method of preparing the latter hydrocarbon epoxides comprises oxidation of the corresponding unsaturated hydrocarbons with peracetic acid, preferably containing little or no acetic acid. The unsaturated hydrocarbon and the peracetic acid are agitated while the reaction mixture is held at a low temperature, preferably around room temperature or below. In many instances it is important that little or no acetic acid be present in the original peracetic acid because the produced epoxides readily react with acetic acid to form undesirable by-products.

Diisobutylene exists in two isomeric forms, one having the double bond in the 1,2 position, the other having the double bond in the 2,3 position. These isomers have boiling points differing only by about 3° C. and hence cannot be separated with any high degree of efficiency. However, the oxirane derivatives of these isomers have boiling point differences of about 10° C. and can be effectively separated by the usual distillation procedures. The epoxide of the α isomer of diisobutylene is 1,2-epoxy-2,4,4-trimethyl pentane. This isomer has a high reactivity with amines, resembling the reactivity of styrene oxide. It has a specific gravity, 20/20° C., of 0.823; a boiling point (760 mm.) of 141° C.; a viscosity at 20° C. of 1.21 cps. and a refractive index, $n_D$ at 20° C., of 1.4097. The epoxide of the β isomer of diisobutylene, 2,3-epoxy-2,4,4-trimethyl pentane, has a relatively low reactivity in comparison to the epoxide of the α isomer. The epoxide of the β isomer of diisobutylene has a specific gravity, 20/20° C., of 0.814; a boiling point (750 mm.) of 128° C.; a viscosity at 20° C. of 0.92; and a refractive index, $n_D$ at 20° C., of 1.4026.

One method of preparing the compositions is to react a mixture of hydrocarbon epoxides of the two types such as a mixture of ethylene oxide and one or more hydrocarbon epoxides of group containing at least 4 carbons. A more preferred procedure from the standpoint of obtaining reproducible results is the sequential addition of one type of hydrocarbon epoxide and then the other. In some instances it will be desirable to react only a portion of one type with one primary amino group, then react the other primary amino group with the other type of hydrocarbon epoxide and thereafter add the remainder of the first-mentioned type. Other manipulative steps will be suggested to one skilled in the art, depending upon the type of composition desired.

The hydrocarbon epoxides and polyalkylene polyamines are reacted by mixing the compositions, usually under pressure, at elevated temperatures. The hydrocarbon epoxide may be in the gaseous phase or the liquid phase depending upon the boiling point of the hydrocarbon epoxide at the reaction pressure and temperature. An initial temperature of approximately 75–90° C. is recommended for gaseous oxide such as ethylene oxide, the reaction temperature being held below 120° C. during the reaction period. These temperatures are raised somewhat for the higher molecular weight oxides, particularly those which are more inert to reaction with amines than the gaseous ethylene oxide. Only the monoepoxy hydrocarbon compounds are employed in this invention because polyepoxy hydrocarbon compounds lead to polymerization and often to cross-linking to form an insoluble resinous composition. Basic alkali metal compounds should be excluded because they promote polyoxyalkylation.

The following general example illustrates the general procedure for preparing the compositions of our invention:

GENERAL EXAMPLE

The polyalkylene polyamine is weighed and charged into an oxyalkylation reaction vessel. By means of a mechanical pump the polyamine is cycled through the reactor until a temperature of approximately 75–150° C. is secured, depending upon the reactivity of the particular hydrocarbon epoxide to be added. Then the hydrocarbon epoxide is slowly added, maintaining circulation under pressure until an exothermic reaction begins to occur. The rate of addition is controlled in order to maintain a temperature preferably between 90° C. and 200° C., once again depending on the reactivity of the particular hydrocarbon epoxide, at a pressure preferably above atmospheric. External cooling is applied to hold the reaction temperature in the range desired. After the desired amount of oxide has been added, the mixture is recycled for one half to one hour or more to react all of the oxide.

The following examples illustrate the specific embodiments of the invention.

Example I

One mol of diethylenetriamine is heated in an oxyalkylation reactor to approximately 85° C. At that point ethylene oxide is added slowly until an exothermic reaction begins. The rate of addition is controlled to maintain a temperature of about 120° C. and a pressure of 50 p.s.i. After one mol of ethylene oxide has been added, which requires approximately two hours, the mixture is recycled for 30 minutes.

Thereafter two mols of a mixture of butylene oxide-1,2 and butylene oxide-2,3 are added at a temperature of about 110° C. in a manner similar to the addition of ethylene oxide, above. The reaction temperature is held at about 140° C. and the mixture is recycled for one-half hour after all of the butylene oxide has been added. The resulting composition is hydroxy ethyl, di-(hydroxy butyl) diethylenetriamine.

Example II

Ethylene oxide and triethylenetetramine are reacted at a molar ratio of one mol of ethylene oxide to one mol of polyamine according to the procedure in Example I for the reaction of ethylene oxide and diethylenetriamine. Thereafter the resultant composition is reacted with 4 mols of the epoxide of the isomer of diisobutylene at an initial reaction temperature of about 110° C. at a pressure in excess of atmospheric. The reaction temperature is held below 150° C. while the oxide is added in small increments. After all of the oxide is added, the reactants are recycled for a period of one and one-half to two hours at a temperature of about 140° C. The resulting product is hydroxyethyl, tetra-(2,4,4-trimethyl, hydroxy pentyl) triethylenetetramine.

Example III

Three mols of a mixture of the epoxidized isomers of triisobutylene are reacted with one mol of diethylenetriamine at an initial reaction temperature of 120° C. in an oxyalkylation reactor according to the procedure outlined in the general example. The reaction temperature is maintained between 150–155° C. while the oxide is added. After all of the oxide has been added the mixture is recycled at a temperature of 150° C. for one and one-half to two hours. Thereafter, one mol of ethylene oxide is added to the reaction product under the temperature and pressure conditions outlined in Example I.

Example IV

One mol of dipropylenetriamine and one mol of ethylene oxide are reacted according to the procedure outlined in the general example. The ethylene oxide is added slowly to the polyamine at an initial temperature of 85° C. The reaction temperature is maintained between 110 to 120° C. while the oxide is added. After all of the oxide is added the mixture is recycled for a period of one hour at a temperature of 110° C. Thereafter two mols of a mixture of the epoxides of mixed hexene isomers are slowly added to the reaction product at an initial temperature of 125° C. The reaction temperature is maintained at 145–155° C. while the oxide mixture is added. After all of the oxide mixture is added the reactants are recycled for one and one-half hours at 150° C. The resulting product is hydroxy ethyl, di-(hydroxy hexyl) dipropylenetriamine.

Example V

One mol of diethylenetriamine and one mol of butylene oxide-1,4 are reacted according to the procedure of the general example at an initial temperature of 105° C. and at a reaction temperature of 115–120° C. After all of the oxide is added the mixture is recycled for one hour at 115° C. Thereafter 4 mols of ethylene oxide are reacted with the reaction product under the conditions outlined in Example I for the reaction of ethylene oxide and diethylene triamine. The resulting product is hydroxyl butyl, tetra(hydroxyethyl) diethylenetriamine.

Example VI

One mol of ethylene oxide and approximately one mean mol of higher homologs of polyethylene polyamines having 5 and more amino groups are reacted according to the procedure in the general example at an initial temperature of 120° C. and a reaction temperature maintained below 130° C. After all of the oxide is added, the mixture is recycled at 125° C. for one hour. Thereafter one mol of styrene oxide is slowly added at 125° C. The temperature is held at 140° C. during both the addition of styrene oxide and a recycle period of one hour.

*Example VII*

Into a jacketed pressure reaction vessel are charged 10.5 parts by weight of technical grade dihexamethylene triamine. Into a separate charge vessel are charged 2.2 parts by weight of ethylene oxide. The charge vessel is connected to the reaction vessel by means of suitable pipe connections. The reactor contents are thoroughly purged with purified natural gas while heating the reactor contents by means of the steam jacket until a temperature of approximately 70° C. is reached. Heating is continued until 100° C. is reached. At 100° C., the ethylene oxide is pressured into the reactor by means of purified natural gas at a rate sufficient to give a controlled exothermic reaction. The ethylene oxide addition is continued until the charge vessel supply is depleted, the reactor temperature being maintained at 100–120° C. After all the ethylene oxide has been added to the reactor, the reactor contents are recycled for one hour at 100–120° C. to yield the one mole ethylene oxide adduct. Then 3.5 parts of butylene oxide-1,2 are reacted with the ethylene oxide adduct in the conditions specified in Example V for the butylene oxide reaction to give hydroxyethyl, hydroxybutyl dihexamethylene triamine.

*Example VIII*

Repeating the technique described in Example VII, but reacting 10.5 parts by weight of technical dihexamethylene triamine with 4.4 parts by weight of ethylene oxide to yield the two mole ethylene oxide adduct, there is produced hydroxybutyl, di-(hydroxyethyl) dihexamethylene triamine.

Instead of the dihexamethylene triamine used in the last two examples, there may be substituted an equimolar amount of higher homologs thereof such as trihexamethylene tetramine, or mixtures of dihexamethylene triamine and/or trihexamethylene tetramine and/or higher homologs containing 5 and more amino groups. One example of such mixture is Du Pont's Amine 248, which is 40–60% dihexamethylene triamine with the remainder consisting substantially of a mixture of higher molecular weight homologs.

It will be seen from the foregoing description that the invention herein described is adapted to produce a wide variety of compositions. One of the advantages of this invention lies in adaptability in producing a wide variety of polar compounds. The hydroxy ethyl group having the primary hydroxyl group is more reactive, has a markedly greater affinity of the hydroxy alkyl group to water and provides greater polarities in the compositions than the monohydroxy hydrocarbon groups having at least four carbons. By varying the number of each type of hydroxy hydrocarbon group and its position in the molecule, we are able to produce a wide variety of compositions of widely different polarities. Furthermore, the variability of polarities of these compositions is further enhanced by being able to choose from a group of different compounds of each type of hydrocarbon oxide as a reactant. Still further, we are able to leave some of the amine groups unreacted for the favorable properties which the free amino groups impart such as corrosion inhibition of ferrous metals.

The compounds prepared in accordance with the invention are suitable for use as intermediates for various types of organic syntheses, for resin formation, in detergent manufacture, and for the preparation of emulsifiers. They are particularly useful as intermediates for the manufacture of esters of carboxy acids because the primary hydroxyl group reacts readily with organic carboxy acids such as long chain fatty acids as well as the dicarboxy acids including diglycolic acid, maleic anhydride, and phthalic anhydride. The compounds of the present invention can also be employed as starting materials for oxyalkylation reactions in which long chains composed of oxyalkylene groups are added to the hydroxyl groups of such starting materials. Thus, by reacting with the compounds of the examples in the presence of an alkaline catalyst such as sodium hydroxide or sodium methylate with 1,2-propylene oxide, long chains can be built up on the terminal hydroxyl groups to give compositions having a molecular weight of 1200 to 40000 attributable to oxypropylene groups. These compounds can be employed in proportions of 1 part of said compound to from 2000 to 50,000 parts of a water-in-oil petroleum emulsion for the purpose of breaking such emulsion and effecting separation of the water from the oil.

The invention is hereby claimed as follows:

1. Compositions having the formula:

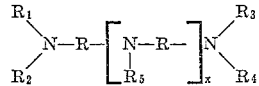

wherein R is a lower alkylene radical; $R_1$, $R_2$, $R_3$, $R_4$, and $R_5$ are selected from the group consisting of hydrogen; 2-hydroxyethyl, mono-secondary-hydroxyalkyl of 4–12 carbons, phenyl mono-secondary-hydroxyethyl, and mono-secondary-hydroxybutenyl, at least one of $R_1$, $R_2$, $R_3$, $R_4$, $R_5$ being 2-hydroxyethyl and at least one other of $R_1$, $R_2$, $R_3$, $R_4$, and $R_5$ being a member selected from the group consisting of said mono-secondary-hydroxyalkyl with 4–12 carbons, said phenyl mono-secondary-hydroxyethyl and said mono-secondary-hydroxybutenyl; and $x$ is an integer of 1–9.

2. Compositions having the formula:

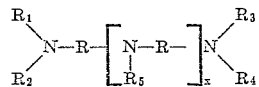

wherein R is a lower alkylene radical; $R_1$, $R_2$, $R_3$, $R_4$, and $R_5$ are selected from the group consisting of hydrogen, 2-hydroxyethyl, mono-secondary-hydroxyalkyl with 4–12 carbons, phenyl mono-secondary-hydroxyethyl, and mono-secondary-hydroxybutenyl, at least one of $R_1$ and $R_2$ being 2-hydroxyethyl and at least one of $R_3$ and $R_4$ being a member selected from the group consisting of said mono-secondary-hydroxyalkyl with 4–12 carbons, said phenyl mono-secondary-hydroxyethyl and said mono-secondary-hydroxybutenyl; and $x$ is an integer of 1–9.

3. Diethylenetriamine which is N-substituted with groups consisting of at least one 2-hydroxyethyl group and at least one member selected from the group consisting of mono-hydroxyalkyl with 4–12 carbons, phenyl mono-secondary-hydroxyethyl, and mono-secondary-hydroxybutenyl.

4. Triethylenetetramine which is N-substituted with groups consisting of at least one 2-hydroxyethyl group and at least one member selected from the group consisting of mono-hydroxyalkyl with 4–12 carbons, phenyl mono-secondary-hydroxyethyl, and mono-secondary-hydroxybutenyl.

5. Tetraethylenepentamine with is N-substituted with groups consisting of at least one 2-hydroxyethyl group and at least one member selected from the group consisting of mono-hydroxyalkyl with 4–12 carbons, phenyl mono-secondary-hydroxyethyl, and mono-secondary-hydroxybutenyl.

6. Dipropylenetriamine with is N-substituted with groups consisting of at least one 2-hydroxyethyl group and at least one member selected from the group consisting of mono-hydroxyalkyl with 4–12 carbons, phenyl mono-secondary-hydroxyethyl, and mono-secondary-hydroxybutenyl.

7. Tripropylenetetramine which is N-substituted with groups consisting of at least one 2-hydroxyethyl group and at least one member selected from the group consisting of mono-hydroxyalkyl with 4–12 carbons, phenyl mono-secondary-hydroxyethyl, and mono-secondary-hydroxybutenyl.

8. Dihexamethylenetriamine which is N-substituted with groups consisting of at least one 2-hydroxyethyl group and at least one member selected from the group consisting of mono-hydroxyalkyl with 4–12 carbons, phenyl mono-secondary-hydroxyethyl, and mono-secondary-hydroxybutenyl.

9. Trihexamethylenetetramine which is N-substituted with groups consisting of at least one 2-hydroxyethyl group and at least one member selected from the group consisting of mono-hydroxyalkyl with 4–12 carbons, phenyl mono-secondary-hydroxyethyl, and mono-secondary-hydroxybutenyl.

10. 2-hydroxyethyl, di-(mono-secondary-hydroxybutyl) diethylene triamine wherein said 2-hydroxyethyl and said hydroxybutyl groups are attached to amino nitrogens of said triamine.

11. 2-hydroxyethyl, mono-secondary-hydroxybutyl dihexamethylenetriamine wherein said 2-hydroxyethyl and said hydroxybutyl goups are attached to amino nitrogens of said triamine.

References Cited in the file of this patent

UNITED STATES PATENTS

| | | |
|---|---|---|
| 2,243,329 | De Groote et al. | May 27, 1941 |
| 2,697,118 | Lundsted et al. | Dec. 14, 1954 |
| 2,701,239 | Ryznar | Feb. 1, 1955 |
| 2,767,214 | Bersworth | Oct. 16, 1956 |
| 2,792,372 | Dickson | May 14, 1957 |
| 2,817,675 | Hofer et al. | Dec. 24, 1957 |
| 2,944,030 | Patton | July 5, 1960 |
| 2,944,985 | De Groote et al. | July 12, 1960 |

UNITED STATES PATENT OFFICE
CERTIFICATE OF CORRECTION

Patent No. 3,152,188            October 6, 1964

Willard H. Kirkpatrick et al.

It is hereby certified that error appears in the above numbered patent requiring correction and that the said Letters Patent should read as corrected below.

Column 2, line 39, for "another" read -- other --; column 6, line 11, for "40000" read -- 4000 --.

Signed and sealed this 13th day of July 1965.

(SEAL)
Attest:

ERNEST W. SWIDER
Attesting Officer

EDWARD J. BRENNER
Commissioner of Patents